Aug. 15, 1944.  B. WALKER  2,355,931
UNIT LOG HANDLING EQUIPMENT
Filed Oct. 24, 1941  2 Sheets-Sheet 1
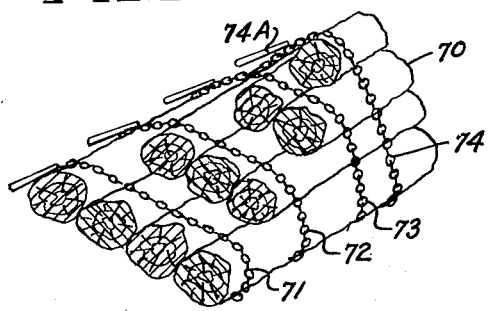
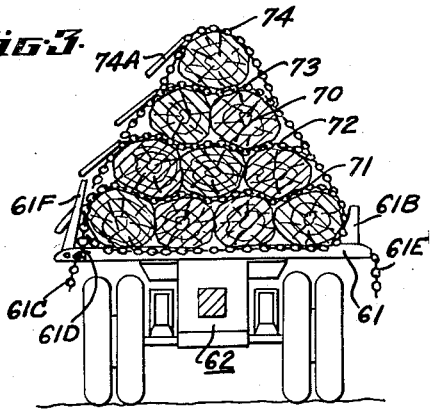
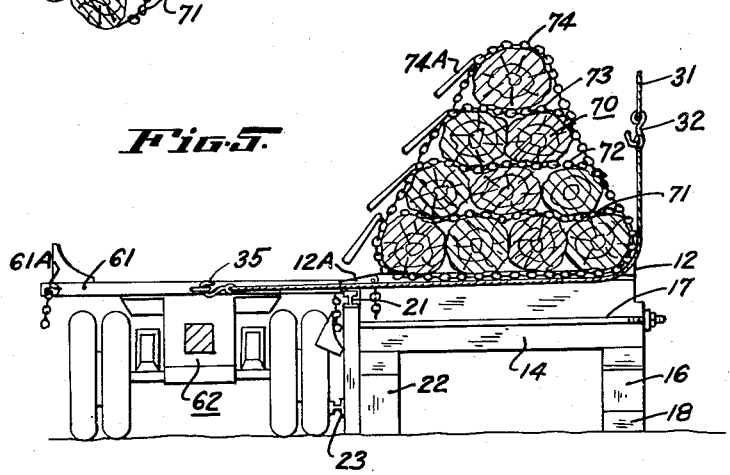
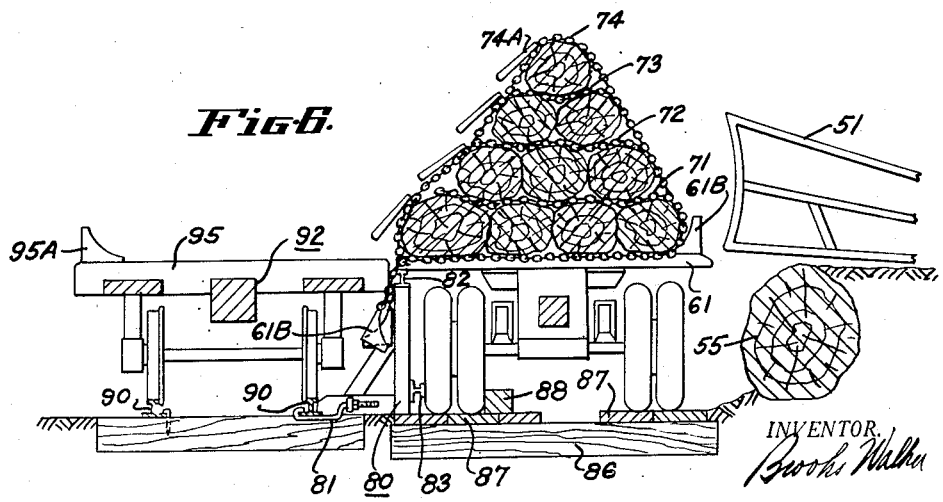
INVENTOR.
Brooks Walker Aug. 15, 1944.   B. WALKER   2,355,931
UNIT LOG HANDLING EQUIPMENT
Filed Oct. 24, 1941   2 Sheets-Sheet 2
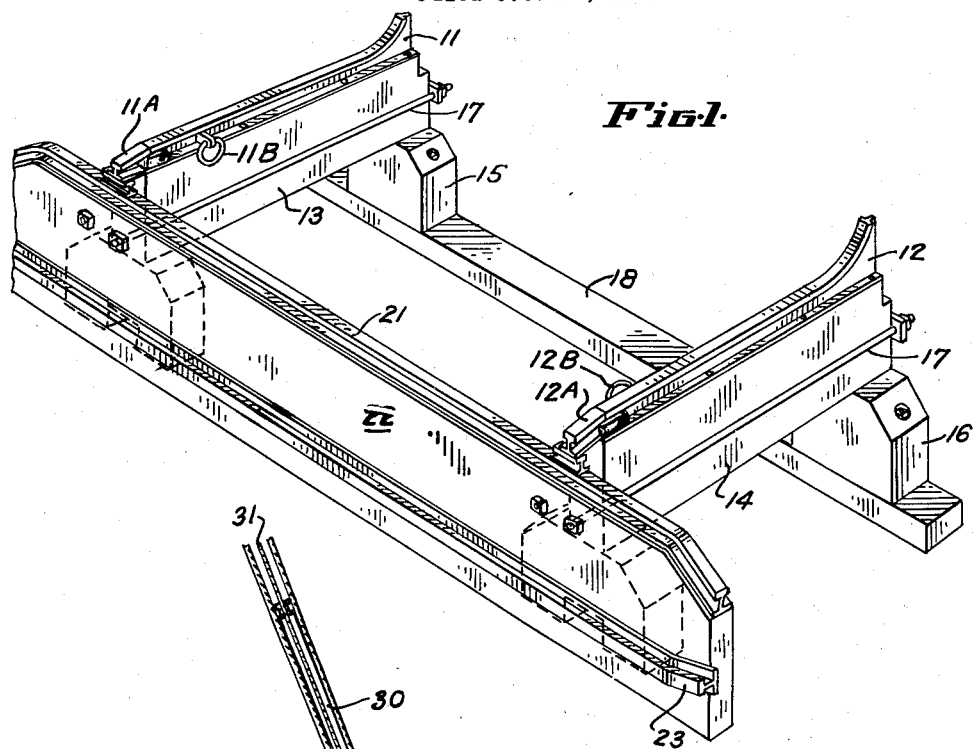
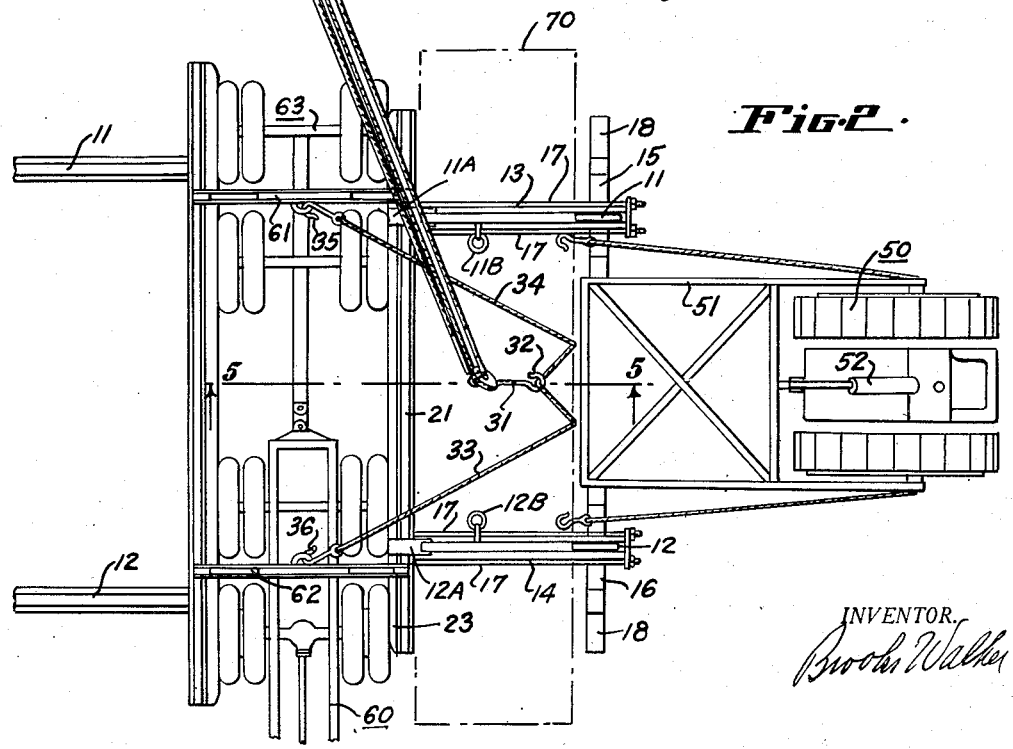
INVENTOR.
Brooks Walker Patented Aug. 15, 1944

2,355,931

UNITED STATES PATENT OFFICE 2,355,931

UNIT LOG HANDLING EQUIPMENT

Brooks Walker, Arlington, Va.

Application October 24, 1941, Serial No. 416,327

4 Claims. (Cl. 214—38)

This invention pertains to improvements in equipment for handling logs, lumber, or other heavy objects which can be formed into a substantially rigid unit or which can be loaded on a transferable body suitable for transferring the load as a substantially rigid unit. It has particular bearing on the handling of logs as a preformed unit built on horses at the loader where the logs are delivered by tractors from the woods to the truck landing where a crane is located for picking the logs up and building a load. The present customary practice is to deliver the logs by tractor to a landing where a crane builds a load on a truck. The truck takes the load to a railroad landing where an unloader dumps the loads by means of a stationary crane, running a cable under one side of the load to an anchor on the far side of the truck and lifting the cable to dump the load. These logs are then picked up by a "jammer" which is usually a steam or engine driven loader which straddles the empty railroad cars, pulls them into position for loading and rebuilds the load on a railroad car.

This proposed invention is to save time and money by revising this operation so that the loader in the woods or wherever the truckload is to be built assembles the load on horses. The truck is then spotted next to the horses when it comes in for its load, the horses being provided with means for holding the truck in desired relationship with the horses and then the loader or other power means skids the load as a unit from the horses on to the truck and/or trailer body and/or bunk. If the load is logs, it is desirable that they be bound in a manner described in this application so as to form a substantially rigid unit during the transfer operation. The bottom logs should be tight together and bound separately and there should be one or more binders around the logs above the bottom course so as to hold the entire load together as a unit when being slid, during the time when the load is transferred and the weight is shifted, which would normally tend to cause the truck body and/or bunk to be materially tilted. The objects of this invention are to so simplify the equipment utilized for the transfer of these loads that a minimum of time will be lost in spotting the truck for the transfer of the load, so that the truck body will be held in a desired position, that the lengthwise spotting of the truck relative to the load will have as much leeway as possible, and so that a minimum of equipment not now used will be necessary in order to put this improved operation into practice, thus saving a material cost in the installation of this invention while at the same time providing a maximum saving in labor and time to utilize the equipment to the best advantage.

Other objects of the invention will be more particularly pointed out in the accompanying specification and claims.

The invention is illustrated by way of example in the accompanying drawings in which:

Figure 1 is a perspective view, partly cut away, showing one form of pre-loading horses forming a part of this invention.

Figure 2 is a plan view, partly cut away and partly diagrammatic, showing the relative position of the pusher, the pre-loading horses, the load, and a truck and trailer and a loading crane boom, just prior to the transferring of the load on to the truck.

Figure 3 is a sectional end view through the center of a load of logs at the binding chain, showing the trailer supporting the end of a load of logs bound as recommended in this application so that the load acts as a unit during the transfer.

Figure 4 is a cut away perspective view of the logs near the center section where the binding chains are located on a load similar to that shown in Figure 3.

Figure 5 is an end sectional view taken at section 5—5 of Figure 2 through the center of the logs looking toward the trailer, showing a load of logs on a pre-loading horse with the trailer in position, just prior to transfer of the load.

Figure 6 is an end view, partly in section, showing the relative position of the loaded truck, the rail adapter, the railroad car, and the pusher for transferring the load, the section being taken substantially at the center of the logs and the center of the rail car.

In all figures, like numerals of reference refer to corresponding parts in the various drawings.

In Figures 1, 2, and 5, the pre-loading horses are preferably constructed as illustrated, in which skid irons 11 and 12 may be economically formed from railroad irons with the end built up to form a permanent stop for the logs. The ends of these skids 11A and 12A may be provided with hinged adapters capable of being swung into a raised position out of the way of the truck and trailer bunks during the time they are being spotted into position for transferring of the load. The horses themselves may be made in a number of different ways; however, the construction as illustrated has been tested and found very satisfactory, in which a heavy timber 13 supports skid iron 11 and timber 14 supports skid iron 12. One end of these timbers rests on a cross timber 15 and 16, respectively, and is suitably bolted and secured thereto. A spacer 18 which also forms a ground skid is preferably secured below these timbers to give a better footing on the ground and to hold the two horses in a relative position. On the truck side of the horses is provided a truck body or bunk adapter skid 21 securely fastened to a heavy timber or timbers 22 on which may preferably be located a tire bumper 23. All this is securely held together with bolts such as 17 so as to form a rigid unit during the building and transferring of the loads, and inasmuch as loads often average 10,000 feet of logs, weighing as much as 100,000 pounds, the horses have to be very substantially built to hold about 50,000 pounds at each end and to stand the bumping during the building of the load, where individual logs may weigh 40,000 pounds more or less. To facilitate moving the horses by the loading crane, which usually has a double line with hooks for dogging the ends of the logs, I have provided two lifting rings 11B and 12B, suitably secured to the skid rails and horses so that the lifting hooks can be inserted in these rings and lift the two horses at or near their balance point, as it is important that they be handled easily because sometimes landings are moved two or three times a day. The pair of horses can be easily moved from one landing to another by dragging behind a tractor or arch and easily spotted into position by means of the loading crane and these eyes 11B and 12B.

At the landing where the tractors deliver the logs or where the load is to be built, the crane, whose boom 30 is shown in Figure 2, has a lifting cable 31 with a hook 32 at the end thereof which is connected with a pair of bridle cables 33 and 34 which are preferably attached to the center of the bunks on the truck 60 and trailer 63 at 35 and 36 so that when the cable 31 is raised, the bridle cables 33 and 34 will force the load 70 from the pre-loading horses on to the truck and truck bunk 62 and trailer bunk 61. As the crane, part of whose boom 30 is shown, is often located directly in back of the truck (as it is sometimes desirable to build the load directly on to the truck), it may be necessary to back the truck into position. In this instance the lifting eye 35 in the trailer bunk may be used to lift the trailer by hook 32 and set the trailer down into position as shown, it then only being necessary to back the truck into position as shown, using the crane to spot the trailer next to skid 23 and with bunk 61 on top of skid 21.

It may be desirable at times instead of using the bridle cable and loading crane to transfer the loads, particularly if they are very heavy, to assist or accomplish the transferring with a tractor such as 50 provided with an extension 51 about as long as the truck or horse bunks and tractor width, enough to keep the loads square during the transfer. This extension 51 may be power raised or lowered as by a cylinder 52 similar to the operation of a conventional bulldozer blade. In some landings or with some types of loads, it may be desirable to use two sets of horses, one on each side of the truck, as shown in the cut away section at the left of Figure 2.

Before the load is transferred on to the truck, it is desirable that the "cheese block" 61A at the far end of the truck body or bunks be set in its desired position so that the load cannot be pushed beyond the desired limit on the truck body and/or bunks.

In order to build the load substantially rigid so that it can be handled as a unit, I found it desirable to use binders substantially as shown in Figures 3, 4, 5, and 6. That is, the bottom course of logs should be built tight together so that when they are pushed or cable-forced to slide, they will not move towards each other and alter the position of the logs above them. A chain 71 should be put around the bottom course of logs. When the next course of logs is put on, they will usually fit in the saddles between the logs in the first course and will tighten the chain on the first course. Also, the chain between the courses tends to tie the load tightly together. In practice, I have found it only necessary to put these chains at the center of the load, though if desirable two or more chains could be placed at each end of the load put around the logs in a manner similar to that shown in Figures 3, 4, 5, and 6. A second chain 72 may preferably be put around the bottom two courses of logs. When the third course is put on, this will tighten chain 72. However, the conventional type of hand-operated chain tighteners, with past center action, or other suitable tighteners may be used on each of the binders where it is found that the next course of logs will not tighten the course of logs sufficiently otherwise. A third binder 73 may be placed around the load, including the third course of logs, and the top log may be placed on top of this to tighten it, and if the saddle provided by the logs below is sufficient, the top log may or may not need an additional binder. If it does, a binder 74 should be used and in this case, hand tightener 74A should be used, as there is no additional log to tighten this chain.

In practice, after considerable experience, we have found that chains 71 and 72 are usually necessary and must stay with the load from the horse to the truck and from the truck to the rail car on to the sawmill pond. The binder chain 74 is desirable for transfer from the horse to the truck and during the truck trip, which is usually over rough logging roads, and for the transfer of the logs from the truck to the rail car. However, on the railroad it has not been found necessary to use chain 74, which also requires a tightener 74A, and therefore as soon as the load is transferred on to the rail car, chain 74 with its tightener 74A is removed from the load and returned by the truck to the loader, avoiding the necessity of having this extra chain and tightener for each of the loads on the log cars.

The bunks on the truck and trailer 61 are usually provided with "cheese block" stops, such as 61B, which are held in position by a chain 61C running through the bunk and suitably locked with a "fit hook" 61D or other suitable means which can be knocked out with a hammer when it is desired to release the "cheese block." The bunk 61 may be provided with a hinged arm 61F controlled by a cable and chain 61E going to the opposite end of the truck bunk, likewise locked with a "fit hook" or other suitable chain lock. In general, "cheese blocks" are more desirable, as when a load is transferred from a truck to a car, the arm sometimes becomes fouled under the load on a car and the truck must be moved sideways to clear the arms, whereas the "cheese blocks" just drop down out of the way and can be replaced before the truck is moved on.

When the truck gets to the railroad car, adapter 80 has been suitably secured to the railroad tracks 90 by means of the hook bolts 81. This adapter may be made of wood and supports a skid or raillike support 82 at the top of the adapter running the length of one or more cars and with its ends turned down to prevent catching on the truck and trailer bunks when they are driven into position. Skid 82 is located at such a height as to suitably support the car end of the truck and trailer bunks so that these bunks are prevented from tilting so that their ends are below the desired height or a little above the bunk 95 on the rail car 92 during the transfer operation. This prevents the bunk on the truck and trailer from assuming a position below the edge of the bunk on the car, which would result in the car bunk sticking into the logs during the transfer and preventing the transfer.

A bumper 83 is preferably located alongside of the adapter 80 so that the truck and trailer are driven with the tires touching this bumper, at which time the skid 82 is in the desired position relative to the truck and trailer bunk ends. The roadway underneath the truck tires may be just dirt but is preferably made of a semi-permanent wooden construction, such as illustrated, with cross ties 86 supporting planking 87 on which the truck tires run. An additional timber 88 may be secured to the planks 87 to help position the truck and trailer prior to the load transfer. This may be particularly desirable in wet or freezing weather when the truck or trailer might tend to skid slightly out of position. The adapter 80 and the bumper 83 keep the truck from moving sideways during the transfer operation.

It has been found that a tractor with an extension such as 51, operating on a ramp 55 about as high as the truck and trailer bunks, makes a very satisfactory means for skidding the load as a unit from the truck and trailer on to the rail car. Though the load may weigh as much as 150,000 pounds and the tractor may only weigh 20,000 pounds, with a coefficient of friction of about .5, it has been found that this is sufficient, particularly with the aid of a slight bump to assist in starting the loads of logs on dry bunks from the truck and trailer on to the railroad car. When the bunks are greased or oiled prior to the transfer operation, it has been found that the effort required to transfer is very greatly reduced. It has also been found desirable to incline slightly the rail track and the truck load to take advantage of gravity to assist in the skidding operation.

Though this description has been limited mostly to the handling of logs, the invention is equally applicable to the handling of any type of load which can be placed on auxiliary bunks or movable bodies, where the loads can be made up in advance on horses, slid sideways on to the truck and/or trailer, requiring a minimum distance slide, a minimum truck and trailer body, and also eliminating the necessity of expensive and complicated machinery sometimes used for lifting and transferring a load from one vehicle to another or from a horse to a vehicle, just the simplest bunks being sufficient, and again allowing the same load to be transferred from the truck on to the rail cars. This is practical because the trucks at present available are capable of carrying loads equal to the allowable loads on rail cars, namely 60,000 to 150,000 pounds, depending upon the cars and trucks.

This scheme has been thoroughly tried out in practice, and where the previous cost of dumping a truckload and reloading it on a car was about 40 cents a thousand feet (lumber scale), it can be transferred by the method described in connection with this application for in the neighborhood of 10 cents per thousand feet, or a saving of 30 cents a thousand feet. This saving is extremely important when one figures that some large mills transfer as much as one and a half million feet a day, where the saving would amount to $450 a day. The saving is threefold: It allows the loader and crew, usually consisting of two hookers, a loader operator, a greaser, and two knotters, to operate in building a load on one or more horses when they might be otherwise waiting for a truck. It reduces the waiting time of the trucks, as it normally takes fifteen to thirty minutes to build a load on a truck, where a pre-built load can be transferred from a horse to a truck in a matter of approximately three minutes. The third saving is to the tractors which are delivering logs to the landing. Most landings have a very limited capacity of logs as the tractor has to deliver them spread out on the ground one deep and nearly in line lengthwise with the truck and trailer. Usually there is only space for logs equivalent to one or possibly two truckloads. With two horses available on a landing, each horse can carry a load of logs in a very limited space and the landing can still carry almost as many logs on the ground, thus giving a greatly increased reservoir of logs at the landing, and reducing the waiting time of the tractors when the ground is covered with logs and there is no truck available for loading.

Though I have described this invention in most detail relative to the handling of loads of logs on which most of the work has been done, it is to be understood that it is equally applicable to handling loads of pipe, poles, timbers, metal shapes, or other long objects which can be bound together as a unit, or for loads of smaller pieces which can be formed into a unit load on a movable or temporary base.

While I have described and illustrated several embodiments of my invention, it will be apparent to those skilled in the art that various changes, omissions, additions, and substitutions may be made in the construction of the apparatus and that the apparatus may be put to uses other than those described without departing from the spirit of the invention as defined in the appended claims, and I do not wish to limit myself to the exact details as set forth in this application. Further objects of the invention will be more particularly pointed out in the attached claims.

I claim as my invention:

1. Equipment of the class described, including means for binding in a substantially rigid load unit, logs of the like, arranged in horizontal courses, said means having means for binding the logs of the lower course tightly together, the logs of the second course being located in the saddles of the said lower course, thereby increasing the tension on the binding means of the lower course, and means for binding the successive courses upon the lower course and upon one another.

2. Equipment of the class described, including means for binding in a substantially rigid load unit, logs or the like, arranged in horizonal courses, said means having means for binding the logs of the lower course tightly together, the logs of the second course being located in the saddles of the said lower course, thereby increasing the tension on the binding means of the lower course, means for successively binding the successive courses upon the lower course and upon one another, and means sliding the load unit sidewise for loading the load unit onto transporting means without displacing the logs of the respective courses.

3. Equipment of the class described including means for binding in a substantially rigid load unit, logs or the like arranged in courses, a vehicle having transversely disposed skids supporting said load unit, and an adapter located at one side of the vehicle and separate therefrom and consisting of a rigid frame comprising a horizontal base directly supported upon the ground and an upright portion rigid with the base and a bumper supported on said upright below the upper end thereof, said upright at the upper end thereof supporting said skids at the inner ends thereof to limit tilting of the vehicle body when the load is slid sidewise therefrom at the side at which the adapter is located, whereby the vehicle having the load will be limited in tilting movement and maintained in substantially alignment with another vehicle during transfer of the load unit thereto said adapter limiting the minimum space transversely between the truck and the other vehicle to which the load is to be transferred.

4. Equipment of the class described including means for binding in a substantially rigid load unit, logs or the like arranged in courses, said means having means for binding the logs of the lower course tightly together, the logs of the second course being located in the saddles of the said lower course, thereby increasing the tension on the binding means of the lower course, means for successively binding the successive courses upon the lower course and upon one another, a vehicle having transversely disposed skids supporting said load unit, and an adapter located at one side of the vehicle and consisting of a rigid frame comprising a horizontal base directly supported upon the ground and an upright portion rigid with the base and supporting said skids and adapted to limit tilting of the vehicle body when the load is slid sidewise therefrom at the side at which the adapter is located, whereby the vehicle having the load will be prevented from being tilted and will be maintained in substantially horizontal alignment with another vehicle during transfer of the load unit thereto.

BROOKS WALKER.

Patent No. 2,355,931        Granted August 15, 1944

BROOKS WALKER

The above entitled patent was extended July 24, 1951, under the provisions of the act of June 30, 1950, for 6 years and 214 days from the expiration of the original term thereof.

*Commissioner of Patents.*